(12) United States Patent
Kuderer

(10) Patent No.: US 6,194,703 B1
(45) Date of Patent: Feb. 27, 2001

(54) PHOTODIODE ARRAY HAVING A CONTROLLABLE DUMPING CIRCUITRY

(75) Inventor: Hubert Kuderer, Waldbronn (DE)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/315,282

(22) Filed: May 20, 1999

(30) Foreign Application Priority Data

Jun. 26, 1998 (EP) .................................................. 98111834

(51) Int. Cl.[7] .................................................. H01J 40/14
(52) U.S. Cl. .................................. 250/214 R; 250/214 DC
(58) Field of Search ........................ 250/214 R, 214 LA, 250/214 LS, 214 AG, 214 DC; 356/221, 222, 223; 327/515

(56) References Cited

U.S. PATENT DOCUMENTS

| 3,918,060 | * | 11/1975 | Alpers ........................................ 342/62 |
| 4,740,080 | | 4/1988 | Donohue et al. ........................ 356/326 |
| 5,742,058 | | 4/1998 | Pantigny et al. ................ 250/370.08 |

FOREIGN PATENT DOCUMENTS

519105A1  6/1991  (EP) .

* cited by examiner

Primary Examiner—Que T. Le

(57) ABSTRACT

Spectrometers often use a so called charge balance photodiode array. This type of photodiode array uses parallel A/D conversion in each channel of said photodiode array, whereby a charge provided by a photocurrent is accumulated at an integrator circuit, and a dumping circuit removes this charge by well defined charge packets to keep the system in balance. In order to expand the field of application of these photodiode arrays, a storage circuit is inserted to buffer a possible charge overflow caused by a light beam of high intensity, as often occurs when flash light lamps are used in the spectrometers. The storage circuit includes a capacitor, and a current limiter which linearly conducts the photocurrent below a process limit defined by the saturation limit of the dumping circuitry and which, above this limit, converts a photocurrent pulse into a constant overflow current having a duration corresponding to the amplitude of the photocurrent pulse.

11 Claims, 5 Drawing Sheets

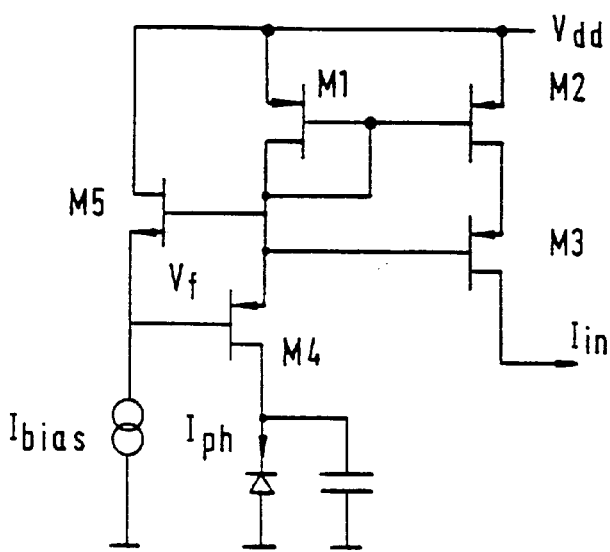
Fig.5
Fig.6
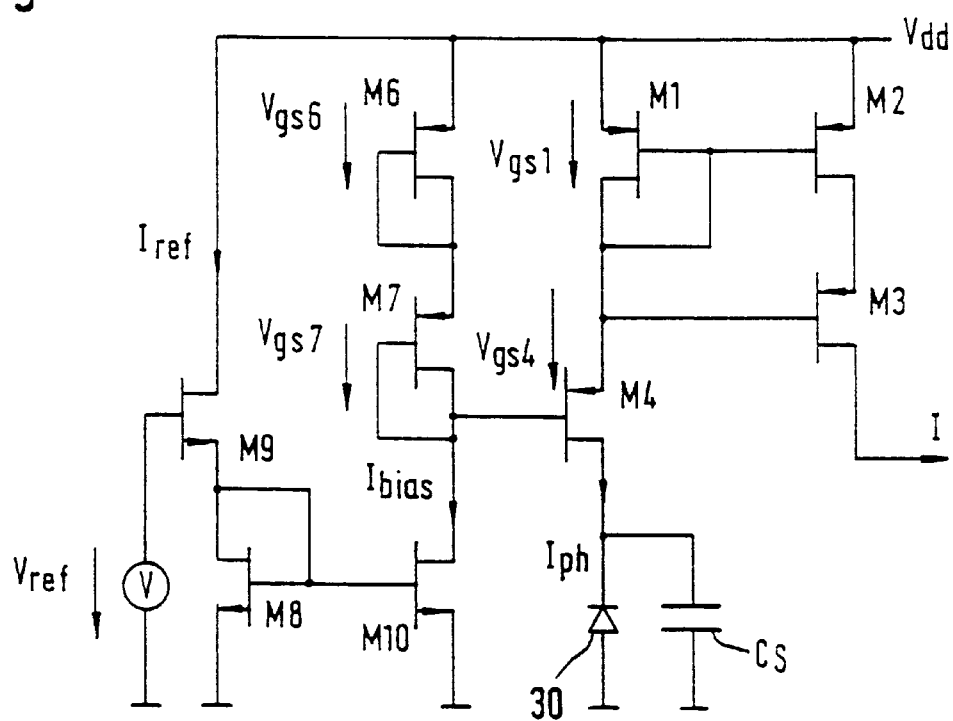

PHOTODIODE ARRAY HAVING A CONTROLLABLE DUMPING CIRCUITRY

BACKGROUND OF THE INVENTION

The invention concerns a photodiode array in accordance with the precharacterizing part of claim 1. Such a photodiode array is used, for example, for measuring the absorption spectrum of a sample substance to derive information concerning the chemical composition of the sample and the amounts of the individual constituents in the sample.

Such a photodiode array is known in the art from European patent EP 0 519 105 B1. This conventional photodiode array can be used in a liquid chromatograph for analyzing the substances eluting from the chromatographic column. It comprises a light source emitting a broad spectrum of ultraviolet and visible radiation and an optical system for focussing the beam onto a sample cell through which the sample substances to be analysed flow. Depending on the specific substances flowing through the cell, the sample absorbs certain characteristic spectral portions of the radiation entering the sample cell so that the spectral composition of the radiation leaving the cell is indicative of the sample substances.

In this spectrometer, the spectrum of the radiation leaving the sample cell is extracted using a diffraction grating disposed in the optical path behind the cell. The diffraction grating directs light rays of different wavelengths into different directions. A linear photodiode array is disposed to receive the light diffracted by the grating. Each diode therefore receives light corresponding to a different wavelength range. The electrical signals produced by the light impinging on each photodiode are read out by a readout circuit and converted to digital data values corresponding to the intensity of the light impinging on the specific diode. These data values are then displayed as a function of wavelength in any convenient form, for example on a CRT screen.

The semiconductor based photodiode array comprises a plurality of photosensitive elements which are connected via electronic switches to a common output line, e.g. a video line which, in turn, is connected to a charge amplifier. Each photosensitive element has an associated capacitor representing the junction capacitance of the photodiodes. The combination of a photosensitive element and associated capacitor is also called a "photocell".

Light impinging on the photosensitive material generates charge carriers to discharge these capacitors. The photocell capacitors are initially charged to a predetermined value and are discharged by the photocurrent generated by the photocells when light impinges thereon. The amount of charge which is necessary to recharge the capacitors to their original values causes a voltage change at the output of the charge amplifier proportional to the light intensity on the photodiode.

A photodiode array comprises a plurality of photocells each generating output signals. Normally, the photodiode array operates in an integrating mode, whereby the photocells are processed sequentially. This is, however, associated with the problem of so called spectral distortion. Particularly in spectrophotometers used to detect the sample substances eluting from the column of a liquid chromatograph, the sample to be analyzed changes as a function of time. Since the signals from the individual photocells are processed sequentially the signals corresponding with certain wavelengths can become time distributed. Another problem is that a single A/D converter is normally used to sequentially convert the signal from individual photodiodes of the photodiode array. Since the number of photodiodes is usually very large, i.e. 1024 photodiodes, the conversion rate of the A/D converter has to be very high, e.g. above 100 kHz, to ensure high measuring accuracy. Such A/D-converters are rather complex and expensive.

For this reason, a parallel architecture in accordance with EP 0 519 105 is preferred for the photodiode array. The signals of each channel, with its own converter, are each generated simultaneously. The requirements for the A/D converters of each channel can therefore be reduced and the measuring accuracy of a time changing sample concentration can be improved.

In accordance with an improved integration of the photodiode array on e.g. a silicon chip, a charge balance type of photodiode array is preferentially used. With this type of photodiode array, the accumulated charge is removed in defined charge packets from a switchable dumping-capacitor. The frequency of charge dumps required to keep the system in balance is proportional to the photocurrent generated by the individual photodiode. For effecting the A/D conversion, each photodiode is connected to the summing node of an integrator which continuously accumulates the charge corresponding to the photocurrent. The output signal of the integrator is periodically compared to a predetermined signal level, i.e. by a suitable comparator, and in response to these comparisons, charge dumps to and/or from the integrator are performed to keep the output signal at a predetermined level. The number of such dumps during a predetermined time interval are counted, i.e. by a logical counter. The counted number is a digital signal representing the actual photocurrent.

In a preferred embodiment of this conventional photodiode array, a current mirror, i.e. a "Wilson current mirror", is used to amplify and to reverse the photocurrent. This embodiment is useful since the photocurrent varies in dependence on differing applications and light intensities. The current mirror is inserted in the photocurrent path between the photocell and the summing node of the integrator circuit, to decouple the junction capacitance of the photocell from the input signal of the integrator at the summing node.

The above mentioned photodiode arrays are used in many different kinds of spectrophotometers for a plurality of different applications. In some cases the light source is a flash light type. This type of light source provides higher light intensities. Their durability and their efficiency is much better than that of continuous light sources.

Disadvantageously, the charge balance photodiode arrays can not operate in conjunction with such flash type light sources, since a charge balance type photodiode array immediately saturates when the photocurrent exceeds a defined limit given by the size of the dumping capacitor and its associated maximum dump rate.

SUMMARY OF THE INVENTION

It is therefore the primary object of the invention to provide a photodiode array which can handle photocurrents caused by a flash light type light source equally well as photocurrents caused by a continuous light source.

This object is solved in a photodiode array of the type having the features of the precharacterizing part of claim 1, by a photodiode array comprising the characterizing features of claim 1.

The primary principle of the invention is to also benefit from a balance charge type photodiode array in applications involving flash light sources by providing the photodiode array with a storage circuit to buffer a possible charge overflow caused by high light intensities characteristic for flash light sources. This prevents saturation of the photodiode array. The charge overflow can be processed as described, i.e. in the time between two flash light pulses.

When the storage circuit comprises a current limiter circuit, the primary principle of storage is to convert a non-processable photocurrent pulse into a processable constant overflow-current having a duration proportional to the value of the photocurrent pulse. The integral of the photocurrent pulse function over time is therefore equal to the integral of the corresponding overflow-current function over time. This integral value corresponds to the intensity of the light impinging to an individual photodiode. The overflow-current value is set below the processing limit of said photodiode array given by the saturation limit.

It is a further object of the invention to also arrange the improved photodiode array on a single semiconductor-chip. It is useful therefor when the current limiter comprises a MOS FET circuit. The additional advantages of MOS FETS are well known in the art.

It is also an object of the invention to maintain the high measuring accuracy of the photodiode array. The current limiter must therefore conduct the photocurrent below the process limit substantially unchanged and convert the photocurrent pulses in a linear manner for overflow current. Towards this end it is useful to operate the MOS FET circuit using a constant forced voltage as gate source voltage.

In accordance with the preferred arrangement of the photodiode array on a single semiconductor chip, the constant voltage source comprises a NMOS FET, back to back connected with a PMOS FET functioning as the current limiter.

In an further improvement in the above mentioned embodiment, instead of the NMOS FET two PMOS FETS in series and connected to a constant current source are used to provide the forced voltage. The advantage of this circuit is the use of PMOS FETS, which can be produced in the same process step. A further advantage is that the circuit compensates for a possible drift in threshold voltages.

The constant current source, in accordance with the features of claim 6, comprises on additional MOS FET circuit. This is also advantageous for as high an integration as possible of the photodiode array on a single chip. It is also an object of the invention, to operate this MOS FET circuit as a constant current source controlled by a constant voltage. Constant voltage operation is advantageous since it is much easier to provide constant voltages than constant currents.

It is also an object of the invention to expand the field of application of the photodiode array. Towards this end, a programmable storage circuit is useful to facilitate variation of the value of the constant overflow current for adjusting the processing limit of the photodiode array.

In an preferred embodiment of this aspect of the invention, at least one switchable current source is circuited to provide an adjustable constant overflow-current.

In an additional embodiment of the invention, a current mirror is circuited between the storage circuit and the integrator circuit in each channel of the photodiode array to amplify and reverse the photocurrent provided by the storage circuit. Amplification of the photocurrent expands the possible applications in view of widely varying light intensities impinging on the photodiodes. Pole reversal of the photocurrent ensures that the by the photocurrent provided charge will be accumulated at the summing node of the integrator circuit and will be removed by defined charge dumps. This is much easier to realize than the inverse operation.

Another advantage of the invention is the common use of a voltage generating circuit for a group of channels or for all channels of the photodiode array. This reduces the complexity of the photodiode array and the manufacturing costs.

Its also advantageous to control the common voltage generating circuit for expanding the range of applications of the invention.

BRIEF DESCRIPTION OF THE DRAWING

An embodiment of the invention is explained in more detail below with reference to the drawings:

FIG. 5 shows a circuit with a second embodiment of a suitable current limiter, FIG. 6 shows a circuit for an improved embodiment of the circuit of FIG. 5 with an additional MOSFET-circuit for generating a feeding current $I_{bias}$.

DESCRIPTION OF THE PREFERRED EMBODIMENT

Figure 1:
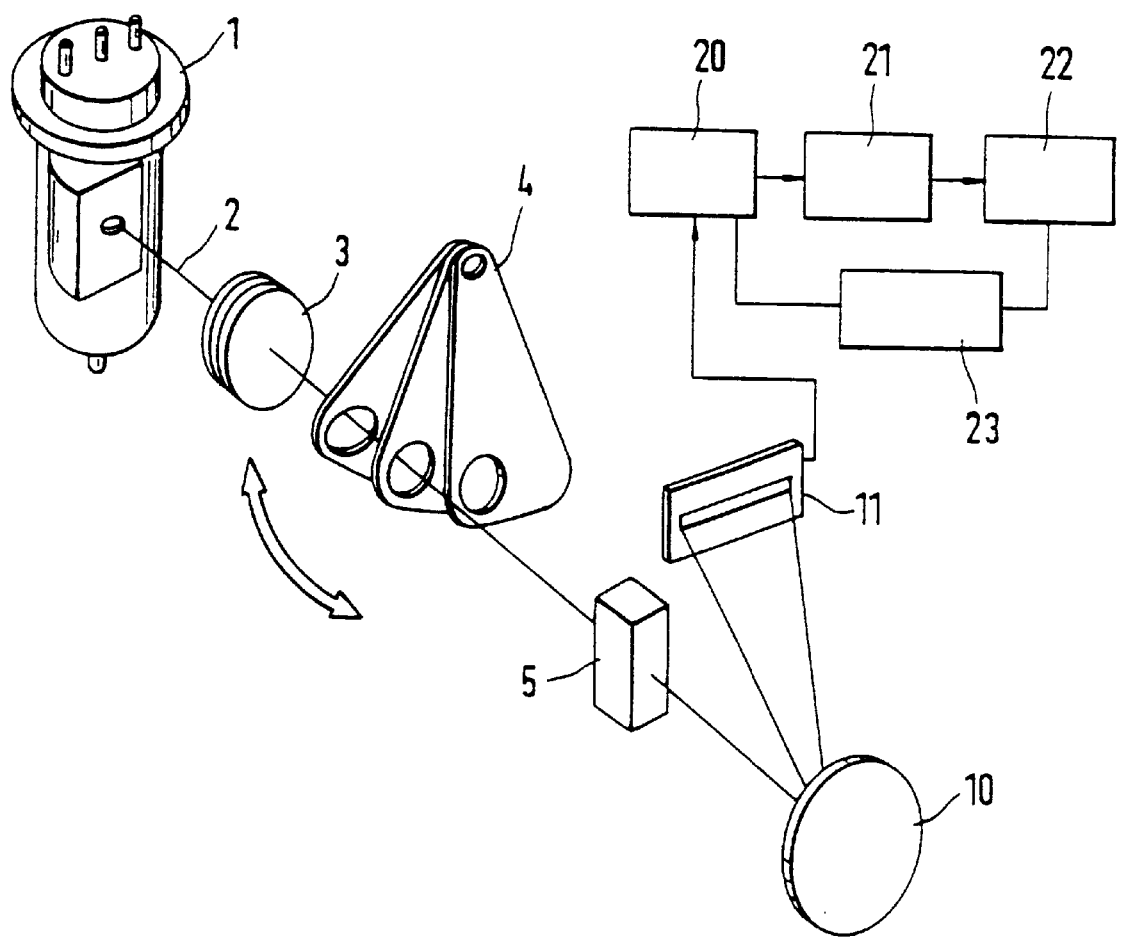
FIG. 1 shows a schematic diagram of a photodiode array spectrometer comprising a photodiode array according to the invention.

FIG. 1 schematically shows a photodiode array for measurement of the absorption of a polychromatic beam of ultraviolet and/or visible radiation by a sample being analyzed.

The spectrometer comprises a light source 1, e.g. a deuterium lamp which emits a light beam 2 of polychromatic radiation. In accordance with the invention, the light source 1 may also be a flash light type lamp. The light beam 2 is focused by a lens system 3 into a sample cell 5. The lens system 3 is preferably an achromatic system to ensure that rays of different wavelengths substantially have the same focal point. A shutter 4 is provided to interrupt the light beam 2 in order to measure the dark signal at the photodiodes of the photodiode array 11. In the actual measurement, with the beam 2 passing through sample cell 5, the dark signal and other offset signals are subtracted from the measured values to compensate for measuring errors.

The sample cell 5 may comprise an inlet and an outlet through which a sample liquid being analyzed continuously flows. Such a spectrometer is used in liquid chromatographs connected to a chromatographic separation column from which sample substances are continuously eluting.

The polychromatic radiation entering the sample cell 5 is partially absorbed by the substance in the cell. Depending on the sample substances, rays of certain wavelengths are absorbed more strongly than rays of other wavelengths. As a result thereof, the beam leaving the cell 5 has a different spectral composition than the light beam 2 entering the cell 5 and the resulting spectrum thus contains information about the type and the amount of various substances in the cell 5.

The beam leaving the cell 5 impinges on a holographic diffraction grating 10 which disperses the light in dependence on the different wavelengths in the beam impinging thereon. The spatially separated light rays from the grating 10 are incident on a photodiode array 11 consisting of a plurality of individual light sensitive diodes separated by light insensitive gaps. Each of the photodiodes captures a specific spectral portion of the diffracted radiation.

Figure 2:
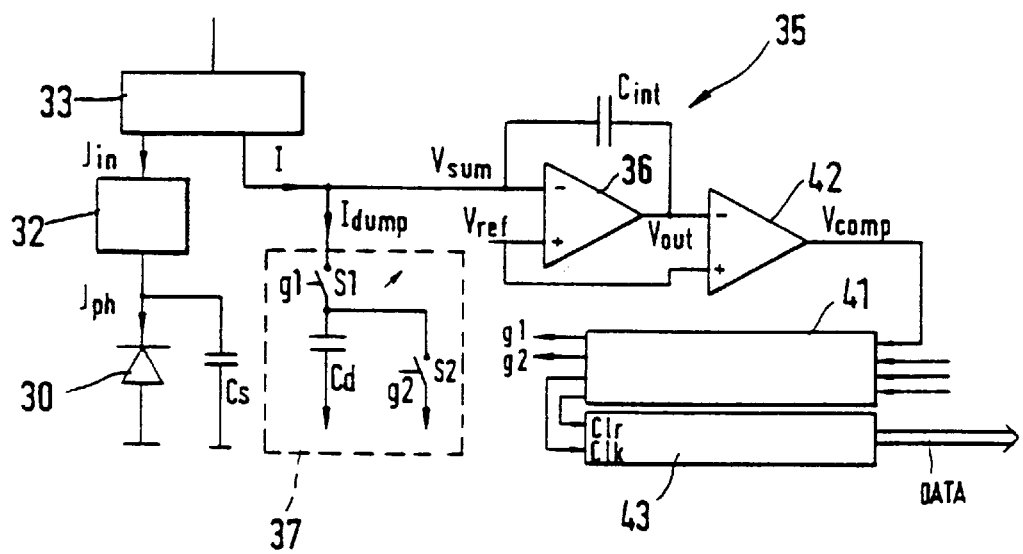
FIG. 2 shows a block diagram illustrating one channel of a charge balance type photodiode array with a current limiter.

The photodiode array 11 is connected to a read out circuit 20 for continuously reading out electrical signals from the photodiodes. These signals are indicative of the intensity of the light signals impinging on the photodiodes. The electrical signals read out from the photodiode array 11 are then further processed in a signal processing unit 21. Operation of the read out circuit 20 and the signal processing unit 21 is controlled by a controller 23 which also controls display means 22 for displaying a spectrum of the analyzed sample. As shown in FIG. 2, a photodiode 30 is reverse biased and acts as a current source. Each photodiode 30 has an associated capacitor $C_s$ which represents the junction capacitance of the photodiodes 30. Photocurrent $I_{ph}$ flows when light impinges on the photodiodes and has a value proportional to the incident light intensity. The photodiode 30 is connected via a current limiter 32 and a downstream current mirror 33 to a summing node 34 of an integrator circuit 35 comprising an operational amplifier 36 and a capacitor $C_{int}$ in its feedback loop. The bias voltage of the photodiode 30 corresponds to the voltage $V_s$ across the capitor $C_s$. An additional dumping circuit 37 comprises a switchable dumping capacitor $C_d$ controlled by a logic circuit 41. The output of the integrator circuit 35 is connected to a comparator circuit 42 connected to said logic circuit 41. The charge dumps of the dumping capacitor $C_d$ needed to keep the system in balance are counted by a digital counter 43. The digital output signal of the counter 43 indicates the light intensity impinging on the photodiode 30. The above described type of photodiode array 11 is called a "charge balance type".

The current mirror 33 is preferably a conventional Wilson current mirror comprising three MOSFETs as e.g. described in EP 0 519 105 B1. Other current mirror circuits could also be used in accordance with the invention.

In accordance with the invention, the current limiter 32 is inserted between the current mirror 33 and the photodiode 30. Its function is to limit the photocurrent $I_{ph}$ to a process limit given by the charge balance type of photodiode array 11 by saturation of the dumping capacitor $C_d$.

Figure 3:
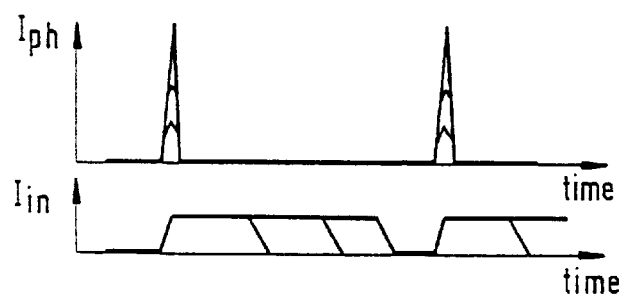
FIG. 3 shows two associated timing diagrams of different photocurrent pulses $I_{ph}$ and the resulting overflow current $I_{in}$.

As can be seen in FIG. 3, a photocurrent pulse $I_{ph}$ emitted by the photodiode 30 and caused by flash light impinging on said photodiode 30 is converted by the current limiter 32 to a nearly rectangular current pulse of constant overflow current $I_{in}$. Its duration corresponds to the amplitude of the photocurrent pulse so that the integrals of both functions $I_{ph}$ and $I_{in}$ over time are at least nearly equal. For illustrative reasons, FIG. 3 shows different photocurrent pulses $I_{ph}$ and the corresponding overflow currents $I_{in}$ in a single time diagram.

In a highly simplified embodiment not shown, the current limiter comprises a RC-filter to limit the photocurrent $I_{ph}$. This embodiment can not be effected as a integrated circuit.

Figure 4:
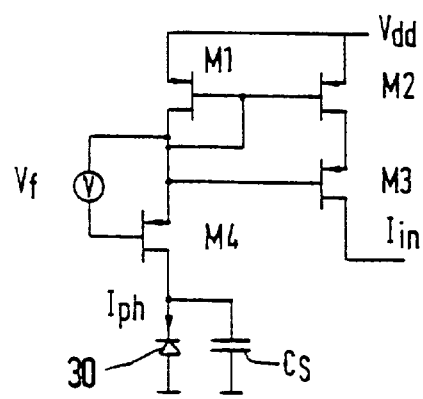
FIG. 4 shows a circuit with a first embodiment of a suitable current limiter.

An improved embodiment is shown in FIG. 4. The MOSFET circuit M1, M2, M3 functions as a current mirror 33. In this embodiment, the current limiter 32 is a MOSFET M4. This MOSFET M4 is used in connection with a constant forced voltage $V_f$ to ensure good conductance of the MOSFET M4 when the photocurrent $I_{ph}$ is below the operation limit and to generate a constant overflow current $I_{in}$ when the photocurrent $I_{ph}$ exceeds this limit. The limit is given by:

$$V_f = V_{th} + V_e$$

wherein the following abbreviations are used:
$V_f$=forced voltage across gate/source of MOSFET M4
$V_{th}$=threshold voltage of MOSFET M4
$V_e$=Voltage excursion from threshold voltage $V_{th}$ at a given overflow current $I_{drain}$
The overflow current $I_{in}$ is then defined as:

$$I_{in} = \frac{u_0 * C_{ox}}{2} \cdot \frac{W}{L} \cdot V_e^2$$

wherein:
$u_0$=channel mobility of the MOSFET M4
$C_{ox}$=Oxide capacitance per unit area
L=channel length of the MOSFET M4
W=channel width of the MOSFET M4

In a further improved embodiment of the invention as seen in FIG. 5, the forced voltage $V_f$ is provided by a NMOSFET M5 back to back connected to a PMOSFET M4 functioning as said current limiter 32. The gate voltage of the NMOSFET M5 is fed by a current source providing a constant feedcurrent $I_{bias}$. A problem associated with this embodiment is the simultaneously use of an n-channel and p-channel-MOSFET M4 and M5 which are manufactured in different steps. The threshold voltages of these connected transistors M4 and M5 may therefore be different. For this reason, determination of a well defined current limit is rather difficult, particularly since definition of a current limit near the operation limit is advantageous to ensure high measurement resolution.

For this reason, a further improved embodiment shown in FIG. 6 uses two PMOSFETs M6 and M7 with their voltage excursions $V_{e6}$ and $V_{e7}$ in series connection to provide the forced voltage $V_f = V_{e6} + V_{e7}$. So long as the voltage excursion $V_e = V_{e4} + V_{e1}$ is less than the value of the forced voltage $V_f$, the MOSFET M4 operates in its linear region. When the voltage excursion $V_e = V_f$, the overflow current $I_{in}$ is given by:

$$I_{in} = I_{bias} \cdot \frac{L_6/W_6 + L_7/W_7}{L_4/W_4 + L_1/W_1}$$

The latter equation shows that the value of the overflow current $I_{in}$ does not depend on process parameters, which are mutually compensating.

A well defined overflow current $I_{in}$ can therefore be adjusted using suitable MOSFET's.

The required constant feed-current $I_{bias}$ is effected in this embodiment by a feeding circuit comprising the additional MOSFET's M8, M9 and M10. This feeding circuit has the advantage of functioning with an enforced voltage $V_{ref}$. Its much easier to maintain a well defined voltage value than a predetermined current value.

Figure 7:
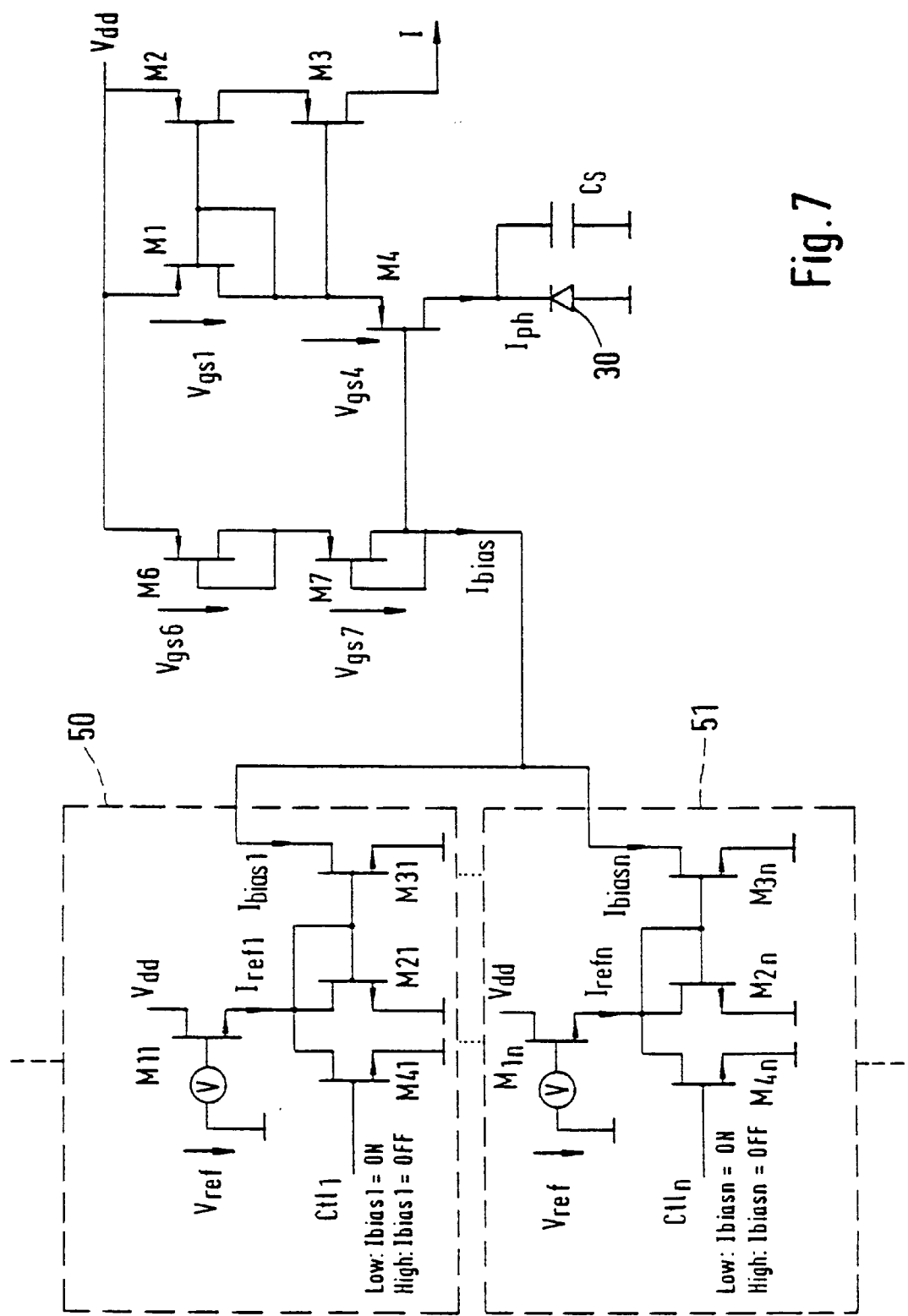
FIG. 7 shows an extension of the circuit of FIG. 6, wherein the current limiter is controllable.

The operation limit for the charge balance photodiode array is given by the maximum rate for generating the fixed charge dumps for a given time period. This maximum rate is usually limited by a clock generator connected to said logic circuit 41 controlling the dumping capacitor $C_d$. It is therefore advantageous to vary the value of the overflow current $I_{in}$. A controllable current limiter 32 as shown in FIG. 7 is useful therefor and is effected by connecting the forced voltage $V_f$ generated by the MOSFET's M6 and M7 to a group of switchable current sources 50, 51, in parallel, generating different values of the constant feed current $I_{bias}$ to thereby control the value of the overflow current $I_{in}$. The number of current sources 50, 51 depends on the application.

Figure 8:
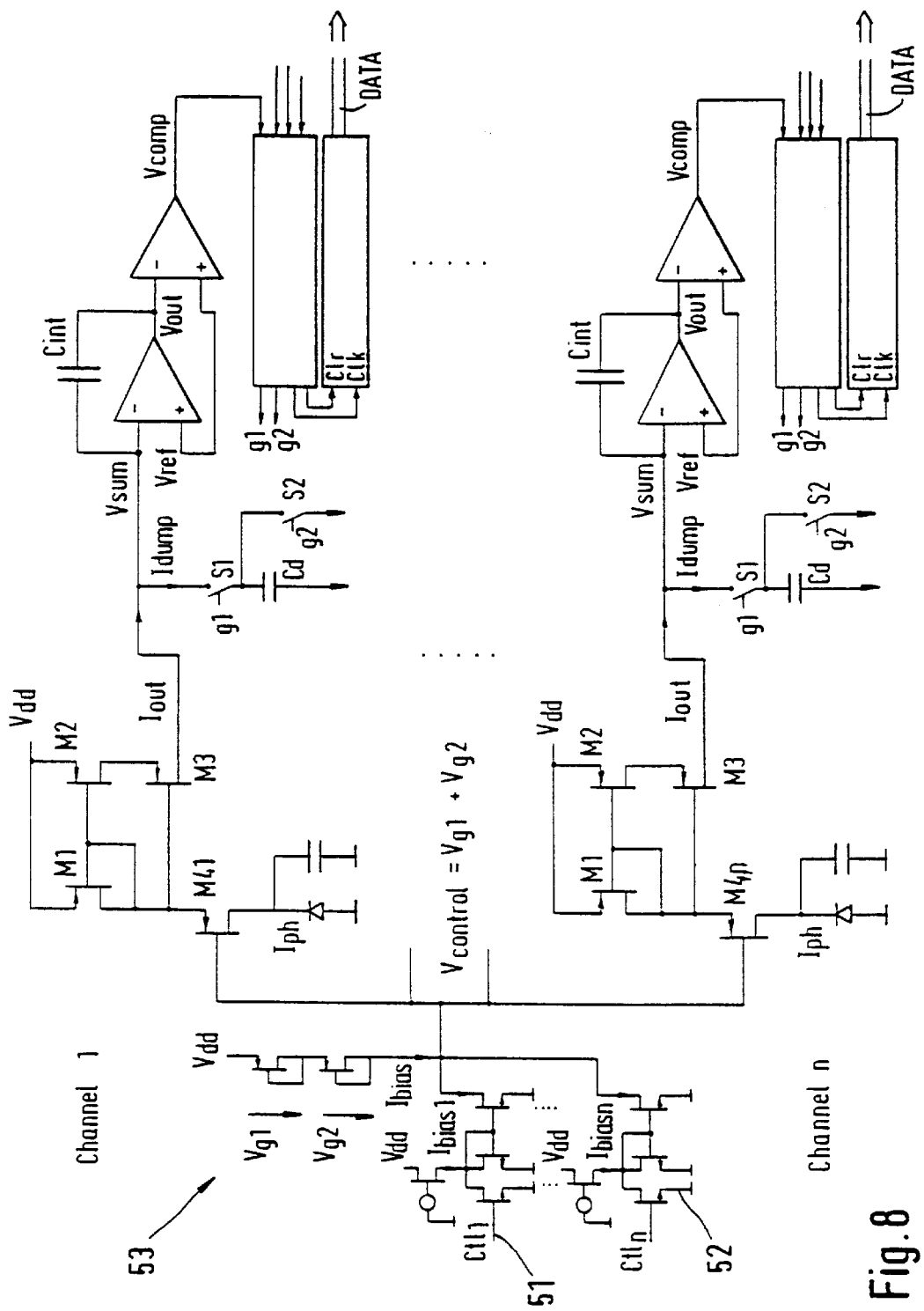
FIG. 8 shows a schematic circuit of a complete photodiode array with one common voltage generating circuit.

As shown in FIG. 8, the photodiode array could be used with one common voltage generating circuit 53 for providing a forced voltage $V_f$ for each parallel channel of the photodiode array. The common voltage generating circuit 53 also comprises some switchable current sources 50, 51.

Continuing the above description, a photodiode array of the charge balance type is described which can be used with both flash light lamps as well as with constant light lamps. Additional features of the invention facilitate a user friendly use of the described photodiode array for a plurality of various applications.

What is claimed is:

1. A photodiode array having a plurality of channels, each channel comprising:
   a photodiode which is reverse biased to act as a current source and which provides an electrical output signal in response to light impinging on said photodiode;
   a signal processing unit for processing said electrical output signal of the photodiode;
   an A/D conversion circuit for providing a digital output signal indicative of the intensity of light impinging on said photodiode, which comprises:
   an integrator circuit for accumulating charge corresponding to the photocurrent provided by the photodiode;
   a controllable dumping circuitry for dumping predefined charge packets to and/or from the integrator circuit;
   a comparator circuit for comparing the output signal of the integrator circuit with a predetermined signal;
   a logic circuit connected to the output of said comparator circuit and to a control input of said dumping circuitry to control said charge flow for keeping the output signal of the comparator circuit within a predetermined range about the predetermined signal; and
   a digital counter for counting the number of charge packets delivered to or from the integrator circuit during a predetermined time interval,
   characterized in that,
   a storage-circuit is inserted into a photocurrent path to buffer a possible charge overflow caused by a high intensity of light impinging on the photodiode and to subsequently direct this charge overflow as a constant overflow-current to or from the integrator circuit in said photocurrent path, wherein this constant overflow-current is always below a predefined process limit.

2. Photodiode array as in claim 1, characterized in that the storage circuit comprises a current limiter circuit to convert a possible photocurrent pulse into said constant overflow-current during a time period, wherein its duration corresponds to the amplitude of said photocurrent pulse to otherwise conduct the photocurrent below said process limit in a substantially unchanged manner.

3. Photodiode array as in claim 2, characterized in that the current limiter comprises a MOS FET inserted into the photocurrent path having a constant forced voltage as gate/source voltage.

4. Photodiode array as in claim 3, characterized in that the current limiter comprises a NMOS FET with a source gate connected to a constant current source providing a constant feed current for said NMOSFET, wherein said NMOSFET is back to back connected to the MOSFET in order to provide said constant forced voltage as gate/source voltage.

5. Photodiode array as in claim 3, characterized in that the current limiter comprises two PMOSFETs in series connection which are connected to a constant current source for providing a constant feed current to maintain the forced voltage as gate-source-voltage for the MOSFET, wherein the MOSFET is a PMOS FET.

6. Photodiode array as in claim 5, characterized in that the constant current source comprises a voltage input and an additional MOSFET circuit to provide the constant feed current.

7. Photodiode array as in claim 1, characterized in that the storage circuit is programmable to control the value of the constant overflow-current during a charge overflow.

8. Photodiode array as in claim 7, characterized in that the current limiter comprises at least one switchable current source to provide an adjustable but constant feed current for the downstream MOS FET circuits.

9. Photodiode array as in claim 1, further comprising a current mirror inserted between the storage circuit and the integrator circuit for amplifying and reversing the photocurrent.

10. Photodiode array as in claim 1, characterized in that at least two channels of said photodiode array are connected in parallel with a common voltage generating circuit providing the forced voltage.

11. Photodiode array as in claim 7, characterized in that the common voltage generating circuit is controllable to control the level of the constant overflow-current.

\* \* \* \* \*